US012478424B2

(12) United States Patent
Govari et al.

(10) Patent No.: US 12,478,424 B2
(45) Date of Patent: Nov. 25, 2025

(54) STAGGERED PAIRS OF BIASED ABLATION ELECTRODES ON BASKET CATHETER

(71) Applicant: Biosense Webster (Israel) Ltd., Yokneam (IL)

(72) Inventors: Assaf Govari, Haifa (IL); Christopher Thomas Beeckler, Brea, CA (US); Joseph Thomas Keyes, Sierra Madre, CA (US); Justin George Lichter, Irvine, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 249 days.

(21) Appl. No.: 17/472,487

(22) Filed: Sep. 10, 2021

(65) Prior Publication Data

US 2023/0084207 A1    Mar. 16, 2023

(51) Int. Cl.
*A61B 18/14* (2006.01)
*A61B 18/00* (2006.01)

(52) U.S. Cl.
CPC .. *A61B 18/1492* (2013.01); *A61B 2018/0016* (2013.01); *A61B 2018/00214* (2013.01); *A61B 2018/00267* (2013.01); *A61B 2018/00577* (2013.01); *A61B 2018/00613* (2013.01); *A61B 2018/1417* (2013.01); *A61B 2018/1475* (2013.01)

(58) Field of Classification Search
CPC ........ A61B 18/1492; A61B 2018/0016; A61B 2018/00214; A61B 2018/00267; A61B 2018/1475
See application file for complete search history.

(56) References Cited

U.S. PATENT DOCUMENTS 4,699,147 A    10/1987    Chilson et al.
4,940,064 A    7/1990    Desai
(Continued)

FOREIGN PATENT DOCUMENTS

CN    105761835 A    7/2016
CN    111248993 A    6/2020
(Continued)

OTHER PUBLICATIONS

Extended European Search Report dated Feb. 2, 2023, from Corresponding European Application No. 22194819.3, 8 pages.
(Continued)

*Primary Examiner* — Adam Z Minchella
*Assistant Examiner* — Ashleigh Lauren Kern (57) ABSTRACT

Embodiments of the present invention include a medical probe having a flexible insertion tube, a basket assembly, and a plurality of electrodes. The basket assembly has a proximal end that is connected distally to the insertion tube and includes a plurality of resilient spines, which have respective outer sides and inner sides and are configured to bow radially outward from an axis of the basket assembly and are conjoined at the proximal end and at a distal end of the basket assembly. The plurality of electrodes are fixed to respective ones of the spines in respective longitudinal positions that are staggered on any given spine relative to the longitudinal positions of the electrodes on the spines adjacent to the given spine, and which include a conductive material that is biased towards the respective outer sides of the spines.

25 Claims, 5 Drawing Sheets

(56) References Cited

U.S. PATENT DOCUMENTS

| | | |
|---|---|---|
| 5,215,103 A | 6/1993 | Desai |
| 5,255,679 A | 10/1993 | Imran |
| 5,293,869 A | 3/1994 | Edwards et al. |
| 5,309,910 A | 5/1994 | Edwards et al. |
| 5,313,943 A | 5/1994 | Houser et al. |
| 5,324,284 A | 6/1994 | Imran |
| 5,345,936 A | 9/1994 | Pomeranz et al. |
| 5,365,926 A | 11/1994 | Desai |
| 5,396,887 A | 3/1995 | Imran |
| 5,400,783 A | 3/1995 | Pomeranz et al. |
| 5,411,025 A | 5/1995 | Webster, Jr. |
| 5,415,166 A | 5/1995 | Imran |
| 5,456,254 A | 10/1995 | Pietroski et al. |
| 5,465,717 A | 11/1995 | Imran et al. |
| 5,476,495 A | 12/1995 | Kordis et al. |
| 5,499,981 A | 3/1996 | Kordis |
| 5,526,810 A | 6/1996 | Wang |
| 5,546,940 A | 8/1996 | Panescu et al. |
| 5,549,108 A | 8/1996 | Edwards et al. |
| 5,558,073 A | 9/1996 | Pomeranz et al. |
| 5,577,509 A | 11/1996 | Panescu et al. |
| 5,595,183 A | 1/1997 | Swanson et al. |
| 5,598,848 A | 2/1997 | Swanson et al. |
| 5,609,157 A | 3/1997 | Panescu et al. |
| 5,628,313 A | 5/1997 | Webster, Jr. |
| 5,681,280 A | 10/1997 | Rusk et al. |
| 5,718,241 A | 2/1998 | Ben-Haim et al. |
| 5,722,401 A | 3/1998 | Pietroski et al. |
| 5,722,403 A | 3/1998 | McGee et al. |
| 5,725,525 A | 3/1998 | Kordis |
| 5,730,128 A | 3/1998 | Pomeranz et al. |
| 5,772,590 A | 6/1998 | Webster, Jr. |
| 5,782,239 A | 7/1998 | Webster, Jr. |
| 5,782,899 A | 7/1998 | Imran |
| 5,823,189 A | 10/1998 | Kordis |
| 5,881,727 A | 3/1999 | Edwards |
| 5,893,847 A | 4/1999 | Kordis |
| 5,904,680 A | 5/1999 | Kordis et al. |
| 5,911,739 A | 6/1999 | Kordis et al. |
| 5,928,228 A | 7/1999 | Kordis et al. |
| 5,944,022 A | 8/1999 | Nardella et al. |
| 5,968,040 A | 10/1999 | Swanson et al. |
| 5,983,126 A | 11/1999 | Wittkampf |
| 6,014,579 A | 1/2000 | Pomeranz et al. |
| 6,014,590 A | 1/2000 | Whayne et al. |
| 6,023,638 A | 2/2000 | Swanson |
| 6,119,030 A | 9/2000 | Morency |
| 6,198,974 B1 | 3/2001 | Webster, Jr. |
| 6,216,043 B1 | 4/2001 | Swanson et al. |
| 6,216,044 B1 | 4/2001 | Kordis |
| 6,428,537 B1 | 8/2002 | Swanson et al. |
| 6,456,864 B1 | 9/2002 | Swanson et al. |
| 6,484,118 B1 | 11/2002 | Govari |
| 6,574,492 B1 | 6/2003 | Ben-Haim et al. |
| 6,584,345 B2 | 6/2003 | Govari |
| 6,600,948 B2 | 7/2003 | Ben-Haim et al. |
| 6,738,655 B1 | 5/2004 | Sen et al. |
| 6,741,878 B2 | 5/2004 | Fuimaono et al. |
| 6,748,255 B2 | 6/2004 | Fuimaono et al. |
| 6,780,183 B2 | 8/2004 | Jimenez, Jr. et al. |
| 6,837,886 B2 | 1/2005 | Collins et al. |
| 6,866,662 B2 | 3/2005 | Fuimaono et al. |
| 6,892,091 B1 | 5/2005 | Ben-Haim et al. |
| 6,970,730 B2 | 11/2005 | Fuimaono et al. |
| 6,973,340 B2 | 12/2005 | Fuimaono et al. |
| 6,980,858 B2 | 12/2005 | Fuimaono et al. |
| 6,987,995 B2 | 1/2006 | Drysen |
| 7,048,734 B1 | 5/2006 | Fleischman et al. |
| 7,142,903 B2 | 11/2006 | Rodriguez et al. |
| 7,149,563 B2 | 12/2006 | Fuimaono et al. |
| 7,255,695 B2 | 8/2007 | Falwell et al. |
| 7,257,434 B2 | 8/2007 | Fuimaono et al. |
| 7,274,957 B2 | 9/2007 | Drysen |
| 7,377,906 B2 | 5/2008 | Selkee |
| 7,399,299 B2 | 7/2008 | Daniel et al. |
| 7,410,486 B2 | 8/2008 | Fuimaono et al. |
| 7,522,950 B2 | 4/2009 | Fuimaono et al. |
| 7,591,799 B2 | 9/2009 | Selkee |
| 7,593,760 B2 | 9/2009 | Rodriguez et al. |
| RE41,334 E | 5/2010 | Beatty et al. |
| 7,720,517 B2 | 5/2010 | Drysen |
| 7,846,157 B2 | 12/2010 | Kozel |
| 7,853,302 B2 | 12/2010 | Rodriguez et al. |
| 7,930,018 B2 | 4/2011 | Harlev et al. |
| 8,000,765 B2 | 8/2011 | Rodriguez et al. |
| 8,007,495 B2 | 8/2011 | McDaniel et al. |
| 8,021,327 B2 | 9/2011 | Selkee |
| 8,048,063 B2 | 11/2011 | Aeby et al. |
| 8,103,327 B2 | 1/2012 | Harlev et al. |
| 8,167,845 B2 | 5/2012 | Wang et al. |
| 8,224,416 B2 | 7/2012 | De La Rama et al. |
| 8,235,988 B2 | 8/2012 | Davis et al. |
| 8,275,440 B2 | 9/2012 | Rodriguez et al. |
| 8,295,902 B2 | 10/2012 | Salahieh et al. |
| 8,346,339 B2 | 1/2013 | Kordis et al. |
| 8,357,152 B2 | 1/2013 | Kordis et al. |
| 8,435,232 B2 | 5/2013 | Aeby et al. |
| 8,447,377 B2 | 5/2013 | Harlev et al. |
| 8,475,450 B2 * | 7/2013 | Govari ............... A61B 18/1492 606/41 |
| 8,498,686 B2 | 7/2013 | Grunewald |
| 8,517,999 B2 | 8/2013 | Pappone et al. |
| 8,545,490 B2 | 10/2013 | Mihajlovic et al. |
| 8,560,086 B2 | 10/2013 | Just et al. |
| 8,567,265 B2 | 10/2013 | Aeby et al. |
| 8,712,550 B2 | 4/2014 | Grunewald |
| 8,728,065 B2 | 5/2014 | Fish et al. |
| 8,755,861 B2 | 6/2014 | Harlev et al. |
| 8,825,130 B2 | 9/2014 | Just et al. |
| 8,906,011 B2 | 12/2014 | Gelbart et al. |
| 8,945,120 B2 | 2/2015 | McDaniel et al. |
| 8,979,839 B2 | 3/2015 | De La Rama et al. |
| 9,037,264 B2 | 5/2015 | Just et al. |
| 9,131,980 B2 | 9/2015 | Bloom |
| 9,204,929 B2 | 12/2015 | Solis |
| 9,277,960 B2 | 3/2016 | Weinkam et al. |
| 9,314,208 B1 | 4/2016 | Altmann et al. |
| 9,339,331 B2 | 5/2016 | Tegg et al. |
| 9,486,282 B2 | 11/2016 | Solis |
| 9,554,718 B2 | 1/2017 | Bar-Tal et al. |
| D782,686 S | 3/2017 | Werneth et al. |
| 9,585,588 B2 | 3/2017 | Marecki et al. |
| 9,597,036 B2 | 3/2017 | Aeby et al. |
| 9,687,297 B2 | 6/2017 | Just et al. |
| 9,693,733 B2 | 7/2017 | Altmann et al. |
| 9,782,099 B2 | 10/2017 | Williams et al. |
| 9,788,895 B2 | 10/2017 | Solis |
| 9,801,681 B2 | 10/2017 | Laske et al. |
| 9,814,618 B2 | 11/2017 | Nguyen et al. |
| 9,833,161 B2 | 12/2017 | Govari |
| 9,848,795 B2 | 12/2017 | Marecki |
| 9,894,756 B2 | 2/2018 | Weinkam et al. |
| 9,895,073 B2 | 2/2018 | Solis |
| 9,907,609 B2 | 3/2018 | Cao et al. |
| 9,974,460 B2 | 5/2018 | Wu et al. |
| 9,986,949 B2 | 6/2018 | Govari et al. |
| 9,993,160 B2 | 6/2018 | Salvestro et al. |
| 10,014,607 B1 | 7/2018 | Govari et al. |
| 10,028,376 B2 | 7/2018 | Weinkam et al. |
| 10,034,637 B2 | 7/2018 | Harlev et al. |
| 10,039,494 B2 | 8/2018 | Altmann et al. |
| 10,045,707 B2 | 8/2018 | Govari |
| 10,078,713 B2 | 9/2018 | Auerbach et al. |
| 10,111,623 B2 | 10/2018 | Jung et al. |
| 10,130,420 B2 | 11/2018 | Basu et al. |
| 10,136,828 B2 | 11/2018 | Houben et al. |
| 10,143,394 B2 | 12/2018 | Solis |
| 10,172,536 B2 | 1/2019 | Maskara et al. |
| 10,182,762 B2 | 1/2019 | Just et al. |
| 10,194,818 B2 | 2/2019 | Williams et al. |
| 10,201,311 B2 | 2/2019 | Chou et al. |
| 10,219,860 B2 | 3/2019 | Harlev et al. |
| 10,219,861 B2 | 3/2019 | Just et al. |
| 10,231,328 B2 | 3/2019 | Weinkam et al. |

(56) References Cited

U.S. PATENT DOCUMENTS

| | | |
|---|---|---|
| 10,238,309 B2 | 3/2019 | Bar-Tal et al. |
| 10,278,590 B2 | 5/2019 | Salvestro et al. |
| D851,774 S | 6/2019 | Werneth et al. |
| 10,314,505 B2 | 6/2019 | Williams et al. |
| 10,314,507 B2 | 6/2019 | Govari et al. |
| 10,314,648 B2 | 6/2019 | Ge et al. |
| 10,314,649 B2 | 6/2019 | Bakos et al. |
| 10,342,608 B2 * | 7/2019 | Wang ................ A61B 18/1492 |
| 10,349,855 B2 | 7/2019 | Zeidan et al. |
| 10,350,003 B2 | 7/2019 | Weinkam et al. |
| 10,362,991 B2 | 7/2019 | Tran et al. |
| 10,375,827 B2 | 8/2019 | Weinkam et al. |
| 10,376,170 B2 | 8/2019 | Quinn et al. |
| 10,376,221 B2 | 8/2019 | Iyun et al. |
| 10,398,348 B2 | 9/2019 | Osadchy et al. |
| 10,403,053 B2 | 9/2019 | Katz et al. |
| 10,441,188 B2 | 10/2019 | Katz et al. |
| 10,470,682 B2 | 11/2019 | Deno et al. |
| 10,470,714 B2 | 11/2019 | Altmann et al. |
| 10,482,198 B2 | 11/2019 | Auerbach et al. |
| 10,492,857 B2 | 12/2019 | Guggenberger et al. |
| 10,542,620 B2 | 1/2020 | Weinkam et al. |
| 10,575,743 B2 | 3/2020 | Basu et al. |
| 10,575,745 B2 | 3/2020 | Solis |
| 10,582,871 B2 | 3/2020 | Williams et al. |
| 10,582,894 B2 | 3/2020 | Ben Zrihem et al. |
| 10,596,346 B2 | 3/2020 | Aeby et al. |
| 10,602,947 B2 | 3/2020 | Govari et al. |
| 10,617,467 B2 | 4/2020 | Viswanathan et al. |
| 10,617,867 B2 | 4/2020 | Viswanathan et al. |
| 10,660,702 B2 | 5/2020 | Viswanathan et al. |
| 10,667,753 B2 | 6/2020 | Werneth et al. |
| 10,674,929 B2 | 6/2020 | Houben et al. |
| 10,681,805 B2 | 6/2020 | Weinkam et al. |
| 10,682,181 B2 | 6/2020 | Cohen et al. |
| 10,687,892 B2 | 6/2020 | Long et al. |
| 10,688,278 B2 | 6/2020 | Beeckler et al. |
| 10,702,178 B2 | 7/2020 | Dahlen et al. |
| 10,716,477 B2 | 7/2020 | Salvestro et al. |
| 10,758,304 B2 | 9/2020 | Aujla |
| 10,765,371 B2 | 9/2020 | Hayam et al. |
| 10,772,566 B2 | 9/2020 | Aujila |
| 10,799,281 B2 | 10/2020 | Goertzen et al. |
| 10,842,558 B2 | 11/2020 | Harlev et al. |
| 10,842,561 B2 | 11/2020 | Viswanathan et al. |
| 10,863,914 B2 | 12/2020 | Govari et al. |
| 10,881,376 B2 | 1/2021 | Shemesh et al. |
| 10,898,139 B2 | 1/2021 | Guta et al. |
| 10,905,329 B2 | 2/2021 | Bar-Tal et al. |
| 10,912,484 B2 | 2/2021 | Ziv-Ari et al. |
| 10,918,306 B2 | 2/2021 | Govari et al. |
| 10,939,871 B2 | 3/2021 | Altmann et al. |
| 10,952,795 B2 | 3/2021 | Cohen et al. |
| 10,973,426 B2 | 4/2021 | Williams et al. |
| 10,973,461 B2 | 4/2021 | Baram et al. |
| 10,987,045 B2 | 4/2021 | Basu et al. |
| 11,006,902 B1 | 5/2021 | Bonyak et al. |
| 11,040,208 B1 | 6/2021 | Govari et al. |
| 11,045,628 B2 | 6/2021 | Beeckler et al. |
| 11,051,877 B2 | 7/2021 | Sliwa et al. |
| 11,071,585 B2 | 7/2021 | Zhang et al. |
| 11,109,788 B2 | 9/2021 | Rottmann et al. |
| 11,116,435 B2 | 9/2021 | Urman et al. |
| 11,129,574 B2 | 9/2021 | Cohen et al. |
| 11,160,482 B2 | 11/2021 | Solis |
| 11,164,371 B2 | 11/2021 | Yellin et al. |
| 2002/0198522 A1 | 12/2002 | Kordis et al. |
| 2004/0210121 A1 | 10/2004 | Fuimaono et al. |
| 2006/0009689 A1 | 1/2006 | Fuimaono et al. |
| 2006/0009690 A1 | 1/2006 | Fuimaono et al. |
| 2006/0058813 A1 | 3/2006 | Teague et al. |
| 2006/0100669 A1 | 5/2006 | Fuimaono et al. |
| 2007/0093806 A1 | 4/2007 | Desai et al. |
| 2007/0276212 A1 | 11/2007 | Fuimaono et al. |
| 2008/0234564 A1 | 9/2008 | Beatty et al. |
| 2010/0063478 A1 | 3/2010 | Selkee |
| 2011/0118726 A1 | 5/2011 | De La Rama et al. |
| 2011/0160574 A1 | 6/2011 | Harlev et al. |
| 2011/0190625 A1 | 8/2011 | Harlev et al. |
| 2011/0245756 A1 | 10/2011 | Arora et al. |
| 2011/0301597 A1 | 12/2011 | McDaniel et al. |
| 2012/0271136 A1 * | 10/2012 | Kordis ................ A61B 5/6859 600/374 |
| 2012/0271138 A1 | 10/2012 | Kordis et al. |
| 2012/0271140 A1 | 10/2012 | Kordis et al. |
| 2013/0090651 A1 | 4/2013 | Smith |
| 2013/0150693 A1 | 6/2013 | D'Angelo |
| 2013/0172715 A1 | 7/2013 | Just et al. |
| 2013/0172872 A1 | 7/2013 | Subramaniam et al. |
| 2013/0172883 A1 | 7/2013 | Lopes et al. |
| 2013/0178850 A1 | 7/2013 | Lopes et al. |
| 2013/0190587 A1 | 7/2013 | Lopes et al. |
| 2013/0296852 A1 | 11/2013 | Madjarov et al. |
| 2014/0025069 A1 | 1/2014 | Willard et al. |
| 2014/0052118 A1 | 2/2014 | Laske et al. |
| 2014/0180147 A1 | 6/2014 | Thakur et al. |
| 2014/0180151 A1 | 6/2014 | Maskara et al. |
| 2014/0180152 A1 | 6/2014 | Maskara et al. |
| 2014/0257069 A1 | 9/2014 | Eliason et al. |
| 2014/0276712 A1 | 9/2014 | Mallin et al. |
| 2014/0276746 A1 | 9/2014 | Nabutovsky et al. |
| 2014/0288552 A1 | 9/2014 | Kunis |
| 2014/0309512 A1 | 10/2014 | Govari et al. |
| 2014/0309513 A1 | 10/2014 | Fish et al. |
| 2014/0350551 A1 | 11/2014 | Raatikka et al. |
| 2015/0011991 A1 * | 1/2015 | Buysman ........... A61B 18/1492 606/41 |
| 2015/0045863 A1 | 2/2015 | Litscher et al. |
| 2015/0080693 A1 | 3/2015 | Solis |
| 2015/0105770 A1 | 4/2015 | Amit |
| 2015/0119878 A1 | 4/2015 | Heisel et al. |
| 2015/0133919 A1 | 5/2015 | McDaniel et al. |
| 2015/0208942 A1 | 7/2015 | Bar-Tal et al. |
| 2015/0223757 A1 | 8/2015 | Werneth et al. |
| 2015/0250424 A1 | 9/2015 | Govari et al. |
| 2015/0270634 A1 | 9/2015 | Buesseler et al. |
| 2015/0282859 A1 | 10/2015 | Bencini et al. |
| 2015/0342491 A1 | 12/2015 | Marecki et al. |
| 2015/0342532 A1 | 12/2015 | Basu et al. |
| 2015/0351625 A1 | 12/2015 | Schroth et al. |
| 2015/0366508 A1 | 12/2015 | Chou et al. |
| 2016/0081746 A1 | 3/2016 | Solis |
| 2016/0113582 A1 | 4/2016 | Altmann et al. |
| 2016/0113709 A1 | 4/2016 | Maor |
| 2016/0183877 A1 | 6/2016 | Williams et al. |
| 2016/0228023 A1 | 8/2016 | Govari |
| 2016/0228062 A1 | 8/2016 | Altmann et al. |
| 2016/0278853 A1 | 9/2016 | Ogle et al. |
| 2016/0302858 A1 | 10/2016 | Bencini |
| 2016/0324573 A1 | 11/2016 | Mickelson et al. |
| 2016/0338770 A1 | 11/2016 | Bar-Tal et al. |
| 2017/0027638 A1 | 2/2017 | Solis |
| 2017/0035496 A1 | 2/2017 | Nagale et al. |
| 2017/0065227 A1 | 3/2017 | Marrs et al. |
| 2017/0071543 A1 | 3/2017 | Basu et al. |
| 2017/0071544 A1 | 3/2017 | Basu et al. |
| 2017/0071665 A1 | 3/2017 | Solis |
| 2017/0095173 A1 | 4/2017 | Bar-Tal et al. |
| 2017/0100187 A1 | 4/2017 | Basu et al. |
| 2017/0143227 A1 | 5/2017 | Marecki et al. |
| 2017/0156790 A1 | 6/2017 | Aujla |
| 2017/0164858 A1 | 6/2017 | Basu |
| 2017/0172442 A1 | 6/2017 | Govari |
| 2017/0172651 A1 | 6/2017 | Gross et al. |
| 2017/0185702 A1 | 6/2017 | Auerbach et al. |
| 2017/0202515 A1 | 7/2017 | Zrihem et al. |
| 2017/0221262 A1 | 8/2017 | Laughner et al. |
| 2017/0224958 A1 | 8/2017 | Cummings et al. |
| 2017/0265812 A1 | 9/2017 | Williams et al. |
| 2017/0281031 A1 | 10/2017 | Houben et al. |
| 2017/0281268 A1 | 10/2017 | Tran et al. |
| 2017/0296125 A1 | 10/2017 | Altmann et al. |
| 2017/0296251 A1 | 10/2017 | Wu et al. |
| 2017/0319140 A1 | 11/2017 | Wu et al. |

(56) References Cited

U.S. PATENT DOCUMENTS

| | | |
|---|---|---|
| 2017/0347959 A1 | 12/2017 | Guta et al. |
| 2017/0354338 A1 | 12/2017 | Levin et al. |
| 2017/0354339 A1 | 12/2017 | Zeidan et al. |
| 2017/0354364 A1 | 12/2017 | Bar-Tal et al. |
| 2018/0000540 A1 | 1/2018 | Ogle et al. |
| 2018/0008203 A1 | 1/2018 | Iyun et al. |
| 2018/0028084 A1 | 2/2018 | Williams et al. |
| 2018/0049803 A1 | 2/2018 | Solis |
| 2018/0085064 A1 | 3/2018 | Auerbach et al. |
| 2018/0116595 A1 | 5/2018 | Ruppersberg |
| 2018/0132749 A1 | 5/2018 | Govari et al. |
| 2018/0137687 A1 | 5/2018 | Katz et al. |
| 2018/0160936 A1 | 6/2018 | Govari et al. |
| 2018/0160978 A1 | 6/2018 | Cohen et al. |
| 2018/0168511 A1 | 6/2018 | Hall et al. |
| 2018/0184982 A1 | 7/2018 | Basu et al. |
| 2018/0192958 A1 | 7/2018 | Wu |
| 2018/0192959 A1 | 7/2018 | Mou et al. |
| 2018/0206792 A1 | 7/2018 | Auerbach et al. |
| 2018/0228439 A1 | 8/2018 | Wu et al. |
| 2018/0235692 A1 | 8/2018 | Efimov et al. |
| 2018/0249959 A1 | 9/2018 | Osypka |
| 2018/0256109 A1 | 9/2018 | Wu et al. |
| 2018/0279954 A1 | 10/2018 | Hayam et al. |
| 2018/0303414 A1 | 10/2018 | Toth et al. |
| 2018/0303546 A1 | 10/2018 | Buysman et al. |
| 2018/0310987 A1 | 11/2018 | Altmann et al. |
| 2018/0311497 A1 | 11/2018 | Viswanathan et al. |
| 2018/0338722 A1 | 11/2018 | Altmann et al. |
| 2018/0344188 A1 | 12/2018 | Govari |
| 2018/0344202 A1 | 12/2018 | Bar-Tal et al. |
| 2018/0344251 A1 | 12/2018 | Harlev et al. |
| 2018/0344393 A1 | 12/2018 | Gruba et al. |
| 2018/0360534 A1 | 12/2018 | Teplitsky et al. |
| 2018/0365355 A1 | 12/2018 | Auerbach et al. |
| 2019/0000540 A1 | 1/2019 | Cohen et al. |
| 2019/0008582 A1 | 1/2019 | Govari et al. |
| 2019/0015007 A1 | 1/2019 | Rottmann et al. |
| 2019/0030328 A1 | 1/2019 | Stewart et al. |
| 2019/0053708 A1 | 2/2019 | Gliner |
| 2019/0059766 A1 | 2/2019 | Houben et al. |
| 2019/0069950 A1 | 3/2019 | Viswanathan et al. |
| 2019/0069954 A1 | 3/2019 | Cohen et al. |
| 2019/0117111 A1 | 4/2019 | Osadchy et al. |
| 2019/0117303 A1 | 4/2019 | Claude et al. |
| 2019/0117315 A1 | 4/2019 | Keyes et al. |
| 2019/0125338 A1 | 5/2019 | Shelton, IV et al. |
| 2019/0125437 A1 | 5/2019 | Govari et al. |
| 2019/0125439 A1 | 5/2019 | Rohl et al. |
| 2019/0133552 A1 | 5/2019 | Shemesh et al. |
| 2019/0142293 A1 | 5/2019 | Solis |
| 2019/0164633 A1 | 5/2019 | Ingel et al. |
| 2019/0167137 A1 | 6/2019 | Bar-Tal et al. |
| 2019/0167140 A1 | 6/2019 | Williams et al. |
| 2019/0188909 A1 | 6/2019 | Yellin et al. |
| 2019/0201664 A1 | 7/2019 | Govari |
| 2019/0209089 A1 | 7/2019 | Baram et al. |
| 2019/0216346 A1 | 7/2019 | Ghodrati et al. |
| 2019/0216347 A1 | 7/2019 | Ghodrati et al. |
| 2019/0231421 A1 | 8/2019 | Viswanathan et al. |
| 2019/0231423 A1 | 8/2019 | Weinkam et al. |
| 2019/0239811 A1* | 8/2019 | Just .................. A61B 5/287 |
| 2019/0246935 A1 | 8/2019 | Govari et al. |
| 2019/0298442 A1 | 10/2019 | Ogata et al. |
| 2019/0314083 A1 | 10/2019 | Herrera et al. |
| 2019/0328260 A1 | 10/2019 | Zeidan et al. |
| 2019/0336210 A1 | 11/2019 | Beeckler et al. |
| 2019/0343580 A1 | 11/2019 | Nguyen et al. |
| 2019/0350567 A1 | 11/2019 | Cummins et al. |
| 2020/0000518 A1 | 1/2020 | Kiernan et al. |
| 2020/0008705 A1 | 1/2020 | Ziv-Ari et al. |
| 2020/0008869 A1 | 1/2020 | Byrd |
| 2020/0009378 A1 | 1/2020 | Stewart et al. |
| 2020/0015890 A1 | 1/2020 | To et al. |
| 2020/0022653 A1 | 1/2020 | Moisa |
| 2020/0029845 A1 | 1/2020 | Baram et al. |
| 2020/0046421 A1 | 2/2020 | Govari |
| 2020/0046423 A1 | 2/2020 | Mswanathan et al. |
| 2020/0060569 A1 | 2/2020 | Tegg |
| 2020/0077959 A1 | 3/2020 | Altmann et al. |
| 2020/0093539 A1 | 3/2020 | Long et al. |
| 2020/0129089 A1 | 4/2020 | Gliner et al. |
| 2020/0129125 A1 | 4/2020 | Govari et al. |
| 2020/0129128 A1 | 4/2020 | Gliner et al. |
| 2020/0179650 A1 | 6/2020 | Beeckler et al. |
| 2020/0196896 A1 | 6/2020 | Solis |
| 2020/0205689 A1 | 7/2020 | Squires et al. |
| 2020/0205690 A1 | 7/2020 | Williams et al. |
| 2020/0205737 A1 | 7/2020 | Beeckler |
| 2020/0205876 A1 | 7/2020 | Govari |
| 2020/0205892 A1 | 7/2020 | Viswanathan et al. |
| 2020/0206461 A1 | 7/2020 | Govari et al. |
| 2020/0206498 A1 | 7/2020 | Arora et al. |
| 2020/0289197 A1 | 9/2020 | Viswanathan et al. |
| 2020/0297234 A1 | 9/2020 | Houben et al. |
| 2020/0297281 A1 | 9/2020 | Basu et al. |
| 2020/0305726 A1 | 10/2020 | Salvestro et al. |
| 2020/0305946 A1 | 10/2020 | DeSimone et al. |
| 2020/0375657 A1 | 12/2020 | Olson et al. |
| 2020/0397328 A1 | 12/2020 | Altmann et al. |
| 2020/0398048 A1 | 12/2020 | Krimsky et al. |
| 2021/0015549 A1 | 1/2021 | Haghighi-Mood et al. |
| 2021/0022684 A1 | 1/2021 | Govari et al. |
| 2021/0045805 A1 | 2/2021 | Govari et al. |
| 2021/0059549 A1 | 3/2021 | Urman et al. |
| 2021/0059550 A1 | 3/2021 | Urman et al. |
| 2021/0059608 A1 | 3/2021 | Beeckler et al. |
| 2021/0059743 A1 | 3/2021 | Govari |
| 2021/0059747 A1 | 3/2021 | Krans et al. |
| 2021/0077180 A1 | 3/2021 | Govari et al. |
| 2021/0077184 A1 | 3/2021 | Basu et al. |
| 2021/0082157 A1 | 3/2021 | Rosenberg et al. |
| 2021/0085200 A1 | 3/2021 | Auerbach et al. |
| 2021/0085204 A1 | 3/2021 | Auerbach et al. |
| 2021/0085215 A1 | 3/2021 | Auerbach et al. |
| 2021/0085387 A1 | 3/2021 | Amit et al. |
| 2021/0093292 A1 | 4/2021 | Baram et al. |
| 2021/0093294 A1 | 4/2021 | Shemesh et al. |
| 2021/0093374 A1 | 4/2021 | Govari et al. |
| 2021/0093377 A1 | 4/2021 | Herrera et al. |
| 2021/0100612 A1 | 4/2021 | Baron et al. |
| 2021/0113822 A1 | 4/2021 | Beeckler et al. |
| 2021/0127999 A1 | 5/2021 | Govari et al. |
| 2021/0128010 A1 | 5/2021 | Govari et al. |
| 2021/0133516 A1 | 5/2021 | Govari et al. |
| 2021/0145282 A1 | 5/2021 | Bar-Tal et al. |
| 2021/0161582 A1* | 6/2021 | Byrd .................. A61B 18/1206 |
| 2021/0161592 A1 | 6/2021 | Altmann et al. |
| 2021/0162210 A1 | 6/2021 | Altmann et al. |
| 2021/0169421 A1 | 6/2021 | Govari |
| 2021/0169550 A1 | 6/2021 | Govari et al. |
| 2021/0169567 A1 | 6/2021 | Govari et al. |
| 2021/0169568 A1 | 6/2021 | Govari et al. |
| 2021/0177294 A1 | 6/2021 | Gliner et al. |
| 2021/0177356 A1 | 6/2021 | Gliner et al. |
| 2021/0177503 A1 | 6/2021 | Altmann et al. |
| 2021/0178166 A1 | 6/2021 | Govari et al. |
| 2021/0186363 A1 | 6/2021 | Gliner et al. |
| 2021/0186604 A1 | 6/2021 | Altmann et al. |
| 2021/0187241 A1 | 6/2021 | Govari et al. |
| 2021/0187254 A1 | 6/2021 | Beeckler et al. |
| 2021/0196372 A1 | 7/2021 | Altmann et al. |
| 2021/0196394 A1 | 7/2021 | Govari et al. |
| 2021/0212591 A1 | 7/2021 | Govari et al. |
| 2021/0219904 A1 | 7/2021 | Yarnitsky et al. |
| 2021/0236815 A1 | 8/2021 | Waldstreicher et al. |
| 2021/0278936 A1 | 9/2021 | Katz et al. |
| 2021/0282659 A1 | 9/2021 | Govari et al. |
| 2021/0307815 A1 | 10/2021 | Govari et al. |
| 2021/0308424 A1 | 10/2021 | Beeckler et al. |
| 2021/0338319 A1 | 11/2021 | Govari et al. |
| 2021/0369339 A1 | 12/2021 | Salazar et al. |
| 2022/0071695 A1 | 3/2022 | Beeckler et al. |
| 2022/0071696 A1 | 3/2022 | Beeckler et al. |

(56) References Cited

U.S. PATENT DOCUMENTS

| | | |
|---|---|---|
| 2022/0110679 A1 | 4/2022 | Wang et al. |
| 2022/0304745 A1 | 9/2022 | Olson |
| 2022/0387051 A1 | 12/2022 | Girdhar |
| 2023/0000550 A1 | 1/2023 | Nedved et al. |
| 2023/0130692 A1 | 4/2023 | Wang et al. |
| 2023/0225790 A1 | 7/2023 | Okarski |
| 2023/0346455 A1 | 11/2023 | Beeckler et al. |
| 2023/0346459 A1 | 11/2023 | Beeckler et al. |
| 2023/0346462 A1 | 11/2023 | Beeckler et al. |
| 2023/0346464 A1 | 11/2023 | Beeckler et al. |
| 2024/0216045 A1 | 7/2024 | Keyes |
| 2025/0057589 A1 | 2/2025 | Sandquist et al. |

FOREIGN PATENT DOCUMENTS

| | | | |
|---|---|---|---|
| CN | 111248996 A | 6/2020 | |
| EP | 0668740 A1 | 8/1995 | |
| EP | 0644738 B1 | 3/2000 | |
| EP | 0727183 B1 | 11/2002 | |
| EP | 0727184 B1 | 12/2002 | |
| EP | 2201905 A1 | 6/2010 | |
| EP | 2783651 A1 | 10/2014 | |
| EP | 2699151 B1 | 11/2015 | |
| EP | 2699152 B1 | 11/2015 | |
| EP | 2699153 B1 | 12/2015 | |
| EP | 2498706 B1 | 4/2016 | |
| EP | 2578173 B1 | 6/2017 | |
| EP | 3181082 A1 * | 6/2017 | ......... A61B 18/1492 |
| EP | 3238645 A1 | 11/2017 | |
| EP | 2884931 B1 | 1/2018 | |
| EP | 3315086 A1 | 5/2018 | |
| EP | 2349440 B1 | 8/2019 | |
| EP | 3318211 B1 | 12/2019 | |
| EP | 3581135 A1 | 12/2019 | |
| EP | 2736434 B1 | 2/2020 | |
| EP | 3451962 B1 | 3/2020 | |
| EP | 3791816 A2 | 3/2021 | |
| EP | 3972510 A1 | 3/2022 | |
| EP | 4115834 A1 | 1/2023 | |
| WO | 9421167 A1 | 9/1994 | |
| WO | 9421169 A1 | 9/1994 | |
| WO | 9625095 A1 | 8/1996 | |
| WO | 9634560 A1 | 11/1996 | |
| WO | 0182814 B1 | 5/2002 | |
| WO | 2004087249 A2 | 10/2004 | |
| WO | 2012100185 A2 | 7/2012 | |
| WO | 2013052852 A1 | 4/2013 | |
| WO | 2013162884 A1 | 10/2013 | |
| WO | 2013173917 A1 | 11/2013 | |
| WO | 2013176881 A1 | 11/2013 | |
| WO | 2014176205 A1 | 10/2014 | |
| WO | 2016019760 A1 | 2/2016 | |
| WO | 2016044687 A1 | 3/2016 | |
| WO | 2018111600 A1 | 6/2018 | |
| WO | 2018191149 A1 | 10/2018 | |
| WO | 2019084442 A1 | 5/2019 | |
| WO | 2019143960 A1 | 7/2019 | |
| WO | 2020026217 A1 | 2/2020 | |
| WO | 2020194216 A1 | 10/2020 | |
| WO | 2020206328 A1 | 10/2020 | |
| WO | 2022001908 A1 | 1/2022 | |

OTHER PUBLICATIONS

Extended European Search Report and Opinion dated Jun. 1, 2023, from corresponding European Application No. 23152493.5.

Extended European Search Report and Opinion dated Jun. 7, 2023, from corresponding European Application No. 23152399.4.

Extended European Search Report and Opinion dated Jun. 12, 2023, from corresponding European Application No. 23152448.9.

Extended European Search Report dated Jun. 13, 2023, from Corresponding European Application No. 23152458.8, 12 pages.

Extended European Search Report and Opinion dated Sep. 6, 2023, from corresponding European Application No. 23152472.9.

Extended European Search Report & Search Opinion dated Sep. 19, 2023, from corresponding European Application No. 23170325.7.

Extended European Search Report & Search Opinion dated Sep. 21, 2023, from corresponding European Application No. 23170230.9.

Extended European Search Report & Search Opinion dated Sep. 21, 2023, from corresponding European Application No. 23170409.9.

Extended European Search Report & Search Opinion dated Jan. 2, 2024, from corresponding European Application No. 23170297.8.

\* cited by examiner

STAGGERED PAIRS OF BIASED ABLATION ELECTRODES ON BASKET CATHETER

FIELD OF THE INVENTION

The present invention relates generally to medical probes, and specifically to a medical probe comprising a basket assembly comprising spines having staggered pairs of biased ablation electrodes.

BACKGROUND OF THE INVENTION

Arrhythmias are abnormal heart rhythms that are typically caused by a small area of cardiac tissue that produces irregular heartbeats. Cardiac ablation is a medical procedure that can be performed to treat an arrhythmia by destroying the area of the cardiac tissue causing the irregular heartbeats. Some medical systems use irreversible electroporation (IRE) to ablate cardiac tissue. IRE is a nonthermal ablation method based on the unrecoverable permeabilization of cell membranes caused by short pulses of high voltage delivered to the tissue.

U.S. Patent Application 2011/0118726 to de la Rama et al., describes an ablation catheter comprising a staggered ablation element assembly. The assembly may be expanded and collapsed, and may comprise ablation elements that are discretely spaced from each other longitudinally and/or laterally, wherein at least two of the ablation elements are spaced from one another longitudinally.

U.S. Patent Application 2015/0282859 to Bencini et al., describes a balloon catheter with flexible electrode assemblies. The electrodes in assembly may be staggered, rather than having a regular spacing along longitudinal lines. Such a staggered arrangement can be particularly advantageous with electrodes have a three-dimensional structure, to prevent the electrodes from bunching up when the balloon is in a collapsed arrangement.

U.S. Patent Application 2015/0366508 to Chou et al., describes an expandable catheter assembly. The assembly comprises spines having linearly staggered connection portions. These portions allow an efficiently radially compact design of a surrounding shaft and allow efficient radially compacting of the spines due to the staggered positioning.

U.S. Pat. No. 9,848,795 to Marecki et al., describes an electrode assembly for use in a cardiac mapping procedure. The assembly may comprise bipolar pairs of electrodes having a staggered configuration along the length of a flexible member or a spine.

U.S. Pat. No. 5,782,239 to Webster describes electrode configurations for cardiovascular mapping catheters. The distal end of the catheter comprises a plurality of arms that carry electrodes. The arms bow outwardly upon extension of the inner catheter from the outer catheter to form a three-dimensional shape. Each arm has a spine of a superelastic material. Electrode pairs on each arm are able to be spaced evenly with respect to each other and can have staggered spacing with respect to the electrodes on other arms.

U.S. Pat. No. 10,617,467 to Viswanathan et al., describes devices for focal ablation. The ablation device includes a set of spines coupled to a catheter for medical ablation therapy, and each spine of the set of spines may include a set of electrodes formed on that spine. In some embodiments, the ablation device includes a first spine and a second spine adjacent to the first spine, wherein an electrode of the first spine is disposed closer to a distal end of the ablation device relative to an electrode of the second spine.

U.S. Pat. No. 8,295,902 to Salahieh et al., describes a low-profile electrode assembly. In one embodiment, the assembly may comprise rows of electrodes that line up or can be staggered. IN another embodiment, the assembly may comprise staggered conductive pads 59 that can aid in providing a low profile to reduce a stack-up of the regions of enlarged width or diameter substrate.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a medical probe, including a flexible insertion tube, a basket assembly having a proximal end that is connected distally to the insertion tube and including a plurality of resilient spines, which have respective outer sides and inner sides and are configured to bow radially outward from an axis of the basket assembly and are conjoined at the proximal end and at a distal end of the basket assembly, and a plurality of electrodes, which are fixed to respective ones of the spines in respective longitudinal positions that are staggered on any given spine relative to the longitudinal positions of the electrodes on the spines adjacent to the given spine, and which include a conductive material that is biased towards the respective outer sides of the spines.

In one embodiment, the medical probe further includes an electric signal generator coupled to the electrodes. In some embodiments, the electrical signal generator is configured to simultaneously deliver irreversible electroporation (IRE) pulses between one or more of the electrodes. In other embodiments, the one or more of the electrodes include at least two electrodes fixed to a single given spine or fixed to multiple spines. In additional embodiments, the electrical signal generator is configured to deliver radio frequency energy to one or more of the electrodes.

In another embodiment, the medical probe further includes an insertion sheath containing the insertion tube, the insertion tube has a longitudinal axis, and there is a specified maximum number of the electrodes at any location on the longitudinal axis when the basket assembly is disposed within the insertion sheath and assumes a collapsed configuration. Some embodiments, the electrodes are dimensioned and positioned on the spines so as to fit within the insertion sheath when the basket assembly assumes the collapsed configuration.

In an additional embodiment, the basket assembly has a longitudinal axis and an equator, the longitudinal axis joins the proximal and the distal ends of the basket assembly, the equator corresponding to a line through the spines on a plane orthogonal to the axis and through a midpoint between a proximal end of the basket assembly and a distal end of the assembly on the longitudinal axis, and each of the spines includes at least one electrode on each side of the equator.

In a further embodiment, any pair of alternating spines in the basket assembly includes first and second spines has a first electrode at a longitudinal position fixed to the first the alternating spine that overlaps the longitudinal position of a second electrode fixed to the second spine.

In a supplemental embodiment, any pair of alternating spines in the basket assembly includes first and second spines having a pair of electrodes including a first electrode fixed to the first spine and a second electrode fixed to the second spine, the first and the second electrodes are fixed to their respective spines at a specified longitudinal distance to the distal end of the basket assembly.

In another embodiment, any pair of adjacent spines in the basket assembly includes first and second spines having a pair of electrodes including a first electrode fixed to the first spine and a second electrode fixed to the second spine, and the staggering includes the first and the second electrodes fixed to their respective spines at a specified longitudinal distance to each other. In some embodiments, each of the electrodes includes a length on the axis of the basket assembly, and the specified longitudinal distance is greater than the length of the electrodes.

There is also provided, in accordance with an embodiment of the present invention, a method for fabricating a medical probe, including providing a flexible insertion tube, providing a basket assembly having a proximal end that is connected distally to the insertion tube and including a plurality of resilient spines, which have respective outer sides and inner sides and are configured to bow radially outward from an axis of the basket assembly and are conjoined at the proximal end and at a distal end of the basket assembly, and providing a plurality of electrodes, which are fixed to respective ones of the spines in respective longitudinal positions that are staggered on any given spine relative to the longitudinal positions of the electrodes on the spines adjacent to the given spine, and which include a conductive material that is biased towards the respective outer sides of the spines.

There is provided, in accordance with an embodiment of the present invention, a method for treatment, including inserting, into a body cavity, an insertion tube having a distal end containing a lumen passing through the insertion tube, deploying, into the body cavity from the distal end, a basket assembly having a proximal end that is connected distally to the insertion tube and including a plurality of resilient spines, which have respective outer sides and inner sides and are configured to bow radially outward from an axis of the basket assembly and are conjoined at the proximal end and at a distal end of the basket assembly, and a plurality of electrodes, which are fixed to respective ones of the spines in respective longitudinal positions that are staggered on any given spine relative to the longitudinal positions of the electrodes on the spines adjacent to the given spine, and which include a conductive material that is biased towards the respective outer sides of the spines, positioning the basket assembly so that one or more of the electrodes press against tissue in the body cavity, selecting at least two sets of the electrodes, and conveying, between the selected two sets of the electrodes, ablation energy to the tissue.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

When delivering pulsed field ablation (PFA) in an IRE (irreversible electroporation) procedure, electrodes should contact the tissue being ablated with as large a surface area as possible. Embodiments of the present invention provide a medical probe comprising an insertion tube configured for insertion into a body cavity of a patient. The medical probe also comprises a basket assembly having a proximal end that is connected distally to the insertion tube, i.e., is connected to a distal end of the insertion tube. The basket assembly comprises a plurality of resilient spines. In some embodiments, the spines have respective outer sides and inner sides and are configured to bow radially outward from an axis of the basket assembly and are conjoined at the proximal end and at a distal end of the basket assembly.

The medical probe additionally comprises a plurality of electrodes, which are fixed to respective ones of the spines in respective longitudinal positions that are staggered on any given spine relative to the longitudinal positions of the electrodes on the spines adjacent to the given spine. The electrodes comprise a conductive material that is biased towards the respective outer sides of the spines.

Medical systems implementing embodiments of the present invention enable an IRE ablation field to be generated between two selected sets of electrodes, each set comprising one or more individual electrodes, and a full IRE ablation typically involves generating multiple fields between multiple sets. By having a at least two electrodes on each spine, the number of possible electrode selections is greatly increased.

In some embodiments, the medical probe comprises an insertion tube, the basket assembly assumes a collapsed configuration when positioned within the insertion tube, and the basket assembly can assume an expanded configuration when deployed from a distal end of the insertion tube to a body cavity. By staggering the biased electrodes on spines of the basket assembly, medical probes implementing embodiments of the present invention may require less space (i.e., diameter) when the basket assumes the collapsed configuration within the insertion tube.

System Description

Figure 1:
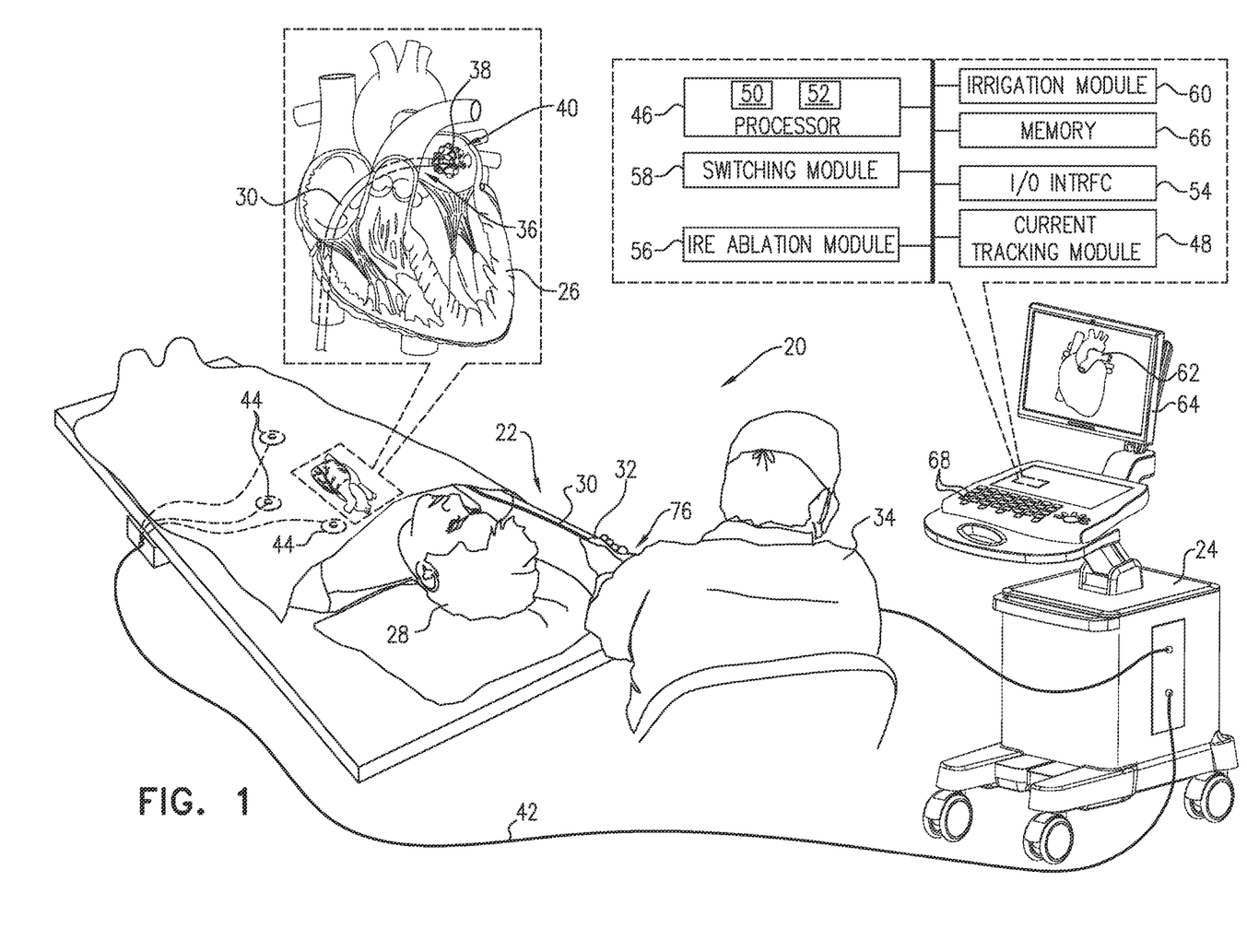
FIG. 1 is a schematic pictorial illustration of a medical system comprising a basket assembly, in accordance with an embodiment of the present invention.

FIG. 1 is a schematic, pictorial illustration of a medical system 20 comprising a medical probe 22 and a control console 24, in accordance with an embodiment of the present invention. Medical system 20 may be based, for example, on the CARTO® system, produced by Biosense Webster Inc. of 31 Technology Drive, Suite 200, Irvine, CA 92618 USA. In embodiments described hereinbelow, medical probe 22 can be used for diagnostic or therapeutic treatment, such as for performing ablation procedures in a heart 26 of a patient 28. Alternatively, medical probe 22 may be used, mutatis mutandis, for other therapeutic and/or diagnostic purposes in the heart or in other body organs.

Figure 2:
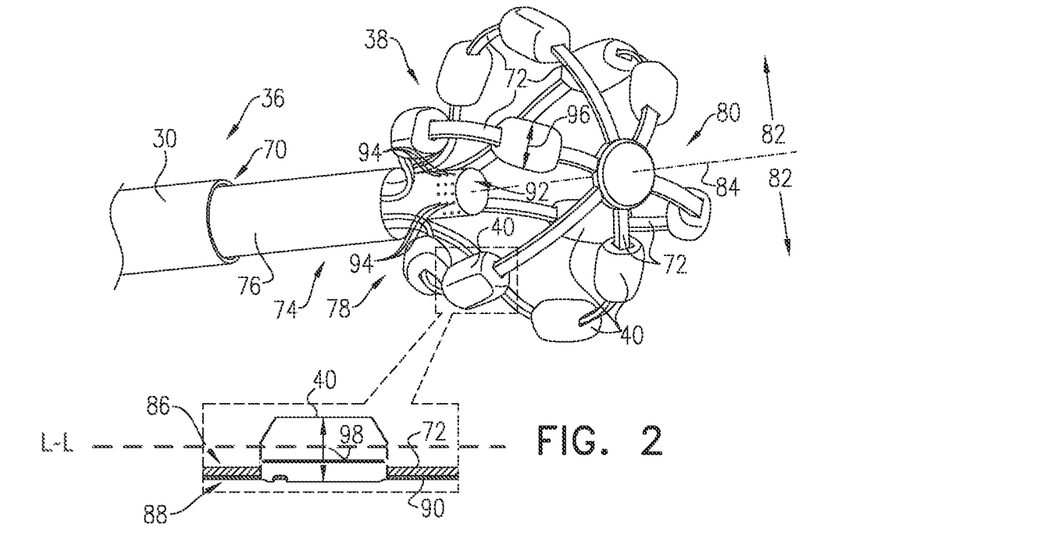
FIG. 2 is a schematic illustration of the basket assembly in an expanded configuration, in accordance with an embodiment of the present invention.

Probe 22 comprises a flexible insertion sheath 30 and a handle 32 coupled to a proximal end of the insertion sheath. Probe 22 also comprises a flexible insertion tube 76 that is contained within insertion sheath 30. During a medical procedure, a medical professional 34 can insert probe 22 through the vascular system of patient 28 so that a distal end 36 of insertion sheath 30 enters a body cavity such as a chamber of heart 26. Upon distal end 36 entering the chamber of heart 26, medical professional 34 can deploy a basket assembly 38 affixed to a distal end 74 of insertion tube 76 (as shown in FIG. 2). Basket assembly 38 comprises a set of electrodes 40, as described in the description referencing FIG. 2 hereinbelow.

To start performing a medical procedure such as irreversible electroporation (IRE) ablation, medical professional 34 can manipulate handle 32 to position distal end 74 so that one or more electrodes 40 engage cardiac tissue at a desired location or locations.

In the configuration shown in FIG. 1, control console 24 is connected, by a cable 42, to body surface electrodes, which typically comprise adhesive skin patches 44 that are affixed to patient 28. Control console 24 comprises a processor 46 that, in conjunction with a current tracking module 48, determines location coordinates of distal end 74 inside heart 26 based on impedances and/or currents measured between adhesive skin patches 44 and electrodes 40 that are affixed to basket assembly 38. In addition to being used as location sensors during a medical procedure, electrodes 40 may perform other tasks such as ablating tissue in the heart.

As described hereinabove, in conjunction with current tracking module 48, processor 46 may determine location coordinates of distal end 74 inside heart 26 based on impedances and/or currents measured between adhesive skin patches 44 and electrodes 40. Such a determination is typically after a calibration process relating the impedances or currents to known locations of distal end 74 has been performed. While embodiments presented herein describe electrodes 40 that are (also) configured to deliver IRE ablation energy to tissue in heart 26, configuring electrodes 40 to deliver any other type of ablation energy to tissue in any body cavity is considered to be within the spirit and scope of the present invention.

Processor 46 may comprise real-time noise reduction circuitry 50 typically configured as a field programmable gate array (FPGA), followed by an analog-to-digital (A/D) signal conversion integrated circuit 52. The processor can be programmed to perform one or more algorithms disclosed herein, each of the one or more algorithms comprising steps described hereinbelow. The processor uses circuitry 50 and circuit 52 as well as features of modules which are described in more detail below, in order to perform the one or more algorithms.

Although the medical system shown in FIG. 1 uses impedance or current-based sensing to measure a location of distal end 74, other location tracking techniques may be used (e.g., techniques using magnetic-based sensors). Impedance and current-based location tracking techniques are described, for example, in U.S. Pat. Nos. 5,983,126, 6,456,864 and 5,944,022. The methods of location sensing described hereinabove are implemented in the above-mentioned CARTO® system and are described in detail in the patents cited above.

Control console 24 also comprises an input/output (I/O) communications interface 54 that enables control console 24 to transfer signals from, and/or transfer signals to electrodes 40 and adhesive skin patches 44. In the configuration shown in FIG. 1, control console 24 additionally comprises an electric signal generator 56 and a switching module 58. While embodiments described herein present the electric signal generator as IRE ablation module 56 (i.e., electric signal generator 56 is also referred to herein as IRE ablation module 56), other types of electric signal generators are considered to be within the spirit and scope of the present invention. For example, electric signal generator 56 may be configured to generate radio frequency (RF) energy.

IRE ablation module 56 is configured to generate IRE pulses comprising peak power in the range of tens of kilowatts. As described hereinbelow, medical system 20 performs IRE ablation by delivering IRE pulses between sets of electrodes 40 simultaneously. In some embodiments, a given set of the electrodes comprises two or more of electrodes 40. Using switching module 58, IRE ablation module 56 can deliver one or more IRE pulses independently between each of the sets of the electrodes. The ablation may comprise multiple pulses to different sets, where each set may be comprised of different electrodes for subsequent pulses.

In order to dissipate the minimal amount of heat generated by the pulse and to improve the efficiency of the ablation process, system 20 supplies irrigation fluid (e.g., a normal saline solution) to distal end 74 via a channel (not shown) in insertion tube 30. Control console 24 comprises an irrigation module 60 to monitor and control irrigation parameters, such as the pressure and the temperature of the irrigation fluid.

Typically, based on signals received from electrodes 40 and/or adhesive skin patches 44, processor 46 can generate an electroanatomical map 62 that shows the location of distal end 74 in the patient's body. During the procedure, processor 46 can present map 62 to medical professional 34 on a display 64, and store data representing the electroanatomical map in a memory 66. Memory 66 may comprise any suitable volatile and/or non-volatile memory, such as random-access memory or a hard disk drive.

In some embodiments, medical professional 34 can manipulate map 62 using one or more input devices 68. In alternative embodiments, display 64 may comprise a touch-screen that can be configured to accept inputs from medical professional 34, in addition to presenting map 62.

FIG. 2 is a schematic illustration of distal end 74 comprising basket assembly 38 in an expanded configuration, in accordance with an embodiment of the present invention. Basket assembly 38 can assume an expanded configuration when unconstrained, such as by being advanced out of an insertion sheath lumen 70 of sheath 30.

By way of example, basket assembly 38 comprises a plurality of resilient spines 72 that are formed at a distal end 74 of insertion tube 76. A proximal end 78 of basket assembly 38 is connected to distal end 74 of insertion tube 76, and spines 72 are cojoined at a distal end 80 of the basket assembly.

During a medical procedure, medical professional 34 can deploy basket assembly 38 by extending insertion tube 76 from sheath 30. Spines 72 may have oval (e.g., elliptical or circular) or rectangular (that may appear to be flat) cross-sections, and typically comprise a flexible, resilient material (e.g., a shape-memory alloy such nickel-titanium, also known as Nitinol). In its expanded (i.e., unconstrained) configuration, basket assembly 38 has an expanded arrangement wherein spines 72 bow in a radially outward direction 82 from a longitudinal axis 84 of the basket assembly that joins proximal end 78 and distal end 80 (i.e., of the basket assembly).

In the configuration shown in FIG. 2, one or more electrodes 40 are threaded on to each given spine 72 so as to fit the electrodes to the spines. Each spine 72 has an outer side 86 and an inner side 88. In embodiments of the present invention, for a given electrode 40 is fitted to a given spine 72, the given spine is assumed to be planar at the given electrode, wherein the plane divides the given electrode asymmetrically so that there is more conductive material on the outer side (of the plane) than on the inner side. The inset of FIG. 2 shows a side view of electrode 40B, the spine 72 extends completely through the electrode 40B on one side such that the spine 72 is offset or "asymmetric" with respect to the center line L-L by being on one side of center line L-L. With the spine 72 offset (by being on one side of center line L-L), electrode 40B will have more of its upper surface (inset of FIG. 2) extending into biological tissues.

In these embodiments, each electrode 40 (i.e., when fitted to a given spine 72) comprises a conductive material that is geometrically biased towards the outer sides of its respective spine, because of the asymmetry referred to above. Therefore, each given electrode 40 has a greater surface area on its outer side compared to the surface area of the given electrode on its inner side. By biasing electrodes 40 to outer side 86 by this asymmetric arrangement, the electrodes deliver more ablation energy from the portion of the electrodes outer side of the spines (i.e., significantly more than the ablation energy delivered from the portion of the electrodes on the inner side of the spines).

Figure 4:
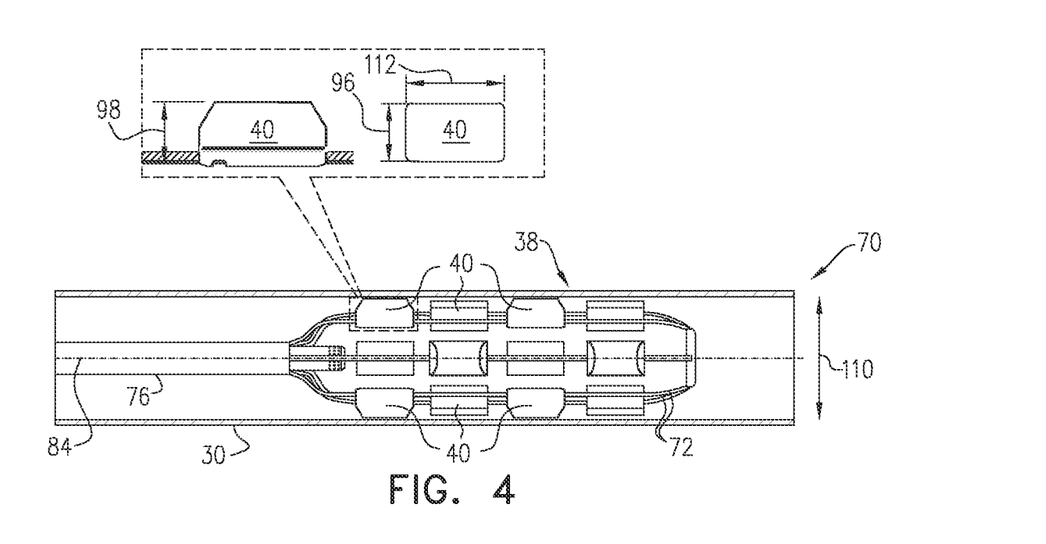
FIG. 4 is a schematic side view of the basket assembly in a collapsed configuration, in accordance with an embodiment of the present invention.

As shown in FIG. 4, a plurality of electrodes 40 are provided in which a spine 72 is configured to extend entirely through the electrodes 40 (electrode 40 having a through passage for insertion of the spine shown in the inset) and then electrodes 40 are fixed (e.g., solder or adhesive) to respective ones of the spines in respective longitudinal positions that are staggered on any given spine relative to the longitudinal positions of the electrodes on the spines adjacent to the given spine In embodiments described herein, electrodes 40 can be configured to deliver ablation energy to tissue in heart 26. In addition to using electrodes 40 to deliver ablation energy, the electrodes can also be used to determine the location of basket assembly 38 and/or to measure a physiological property such as local surface electrical potentials at respective locations on tissue in heart 26.

Examples of materials ideally suited for forming electrodes 40 include gold, platinum and palladium (and their respective alloys). These materials also have very high thermal conductivity which allows the minimal heat generated on the tissue (i.e., by the ablation energy delivered to the tissue) to be conducted through the electrodes to the back side of the electrodes (i.e., the portions of the electrodes on the inner sides of the spines), and then to the blood pool in heart 26.

Probe 22 also comprises a set of wires 90 that couple IRE ablation module 56 to electrodes 40. In some embodiments each spine 72 comprises at least one wire 90 affixed to its inner side 88.

In some embodiments, medical probe 22 comprises a stem 92 that extends longitudinally from the distal end of insertion tube 30. As described supra, control console 24 comprises irrigation module 60 that delivers irrigation fluid to distal end 74, and so to stem 92. Stem 92 comprises multiple spray ports 94, wherein each given spray port 94 is angled to aim delivery of the irrigation fluid to either a given electrode 40 or to tissue in heart 26 (i.e., by aiming the delivery between two adjacent spines 72).

Since electrodes 40 do not comprise spray ports that deliver irrigation fluid, the configuration described hereinabove enables heat to be transferred from the tissue (i.e., during an ablation procedure) to the portion of the electrodes on the inner side of the spines, and the electrodes can be cooled by aiming the irrigation fluid, via spray ports 94, at the portion of the electrodes on the inner side of the spines.

Figure 3:
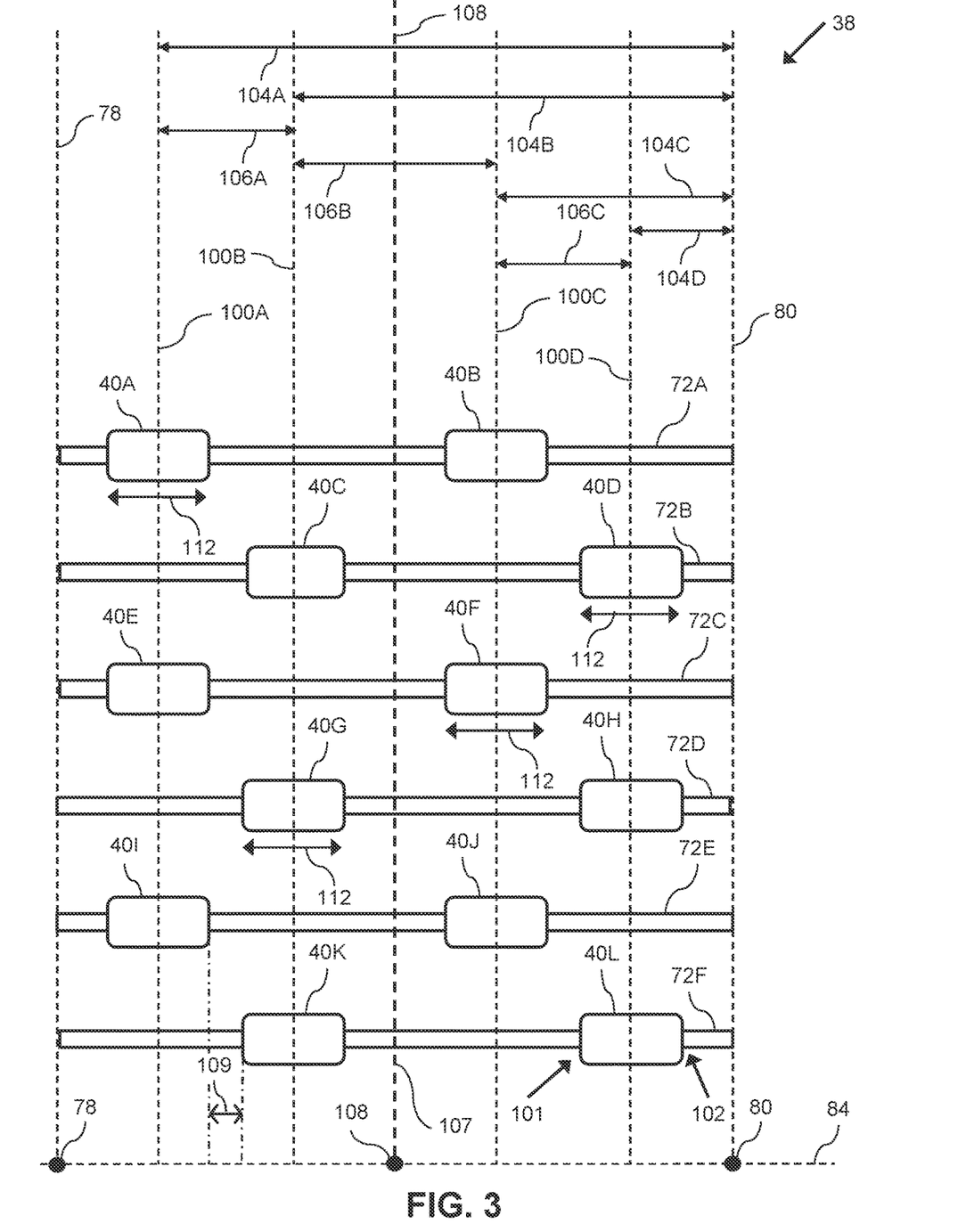
FIG. 3 is a schematic illustration showing staggered electrodes fixed to spines of the basket assembly, in accordance with an embodiment of the present invention.

FIG. 3 is a schematic illustration of electrodes 40 fixed to respective ones of spines 72 at respective longitudinal positions 100 (e.g., relative to axis 84), in accordance with an embodiment of the present invention. In embodiments described herein, a given position 100 for a given electrode 40 comprises any latitudinal coordinates along axis 84 encompassed by the given electrode, when the electrode is projected orthogonally onto the axis. For purposes of visual simplicity and clarity, FIG. 3 shows spines 72 in a two-dimensional configuration and positioned parallel to one another.

In FIG. 3, electrodes 40, spines 72 and positions 100 can be differentiated by appending a letter to the identifying numeral, so that the electrodes comprise electrodes 40A-40L, the spines comprise spines 72A-72F and the longitudinal positions comprise positions 100A-100D. While the configuration in FIGS. 2 and 3 present basket assembly 38 comprising six spines 72 with two electrodes 40 affixed to each of the spines, basket assemblies having any plurality of spines 72 with any number of electrodes 40 affixed to each of the spines are considered to be within the spirit and scope of the present invention.

In the configuration shown in FIG. 3:
Spine 72A is adjacent to spines 72F and 72B (i.e., in basket assembly 38), and comprises electrodes 40A and 40B fixed to spine 72A at respective positions 100A and 100C.
Spine 72B is adjacent to spines 72C and 72A (i.e., in basket assembly 38), and comprises electrodes 40C and 40D fixed to spine 72B at respective positions 100B and 100D.
Spine 72C is adjacent to spines 72B and 72D (i.e., in basket assembly 38), and comprises electrodes 40E and 40F fixed to spine 72C at respective positions 100A and 100C.
Spine 72D is adjacent to spines 72C and 72E (i.e., in basket assembly 38), and comprises electrodes 40G and 40H fixed to spine 72D at respective positions 100B and 100D.
Spine 72E is adjacent to spines 72D and 72F (i.e., in basket assembly 38), and comprises electrodes 40I and 40J fixed to spine 72E at respective positions 100A and 100C.
Spine 72F is adjacent to spines 72E and 72A (i.e., in basket assembly 38), and comprises electrodes 40K and 40L fixed to spine 72F at respective positions 100B and 100D.

Therefore, there are no electrodes 40 on adjacent spines 72 that have respective overlapping positions 100. However, pairs of alternating spines (i.e., spines 72A and 72C, spines 72B and 72D, spines 72C and 72E, spines 72D and 72F and spines 72E and 72A) can have electrodes 40 that have respective overlapping positions 100. In other words, adjacent spines 72 have electrodes 40 at staggered positions 100, and alternating spines have electrodes 40 at overlapping positions 100.

In embodiments herein a pair of alternating spines 72 comprises two of the spines that have a single spine between them. For example, spines 72A and 72C are a pair of alternating spines, since they are both adjacent to a single spine 72B that is between them in basket assembly 38.

In some embodiments of the present invention, electrodes 40 are staggered on spines 72 so as to limit the number of electrodes 40 in any given position 100 to a specific number. In the configuration shown in FIG. 3, the specific number is three, so that:

Electrodes 40A, 40E and 40I are fixed to spines 72A, 72C, 72E at position 100A.

Electrodes 40C, 40G and 40K are fixed to respective spines 72B, 72D and 72F at position 100B so that electrodes 40C, 40G, 40K are staggered or offset distance 106A (measured from line 100A to line 100B) with respect to electrode 40A, 40E, 40I on spines 72A, 72C, 72E.

Electrodes 40B, 40F and 40J are fixed to spines 72A, 72C, 72E at position 100C so that electrodes 40B, 40F, 40J are staggered or offset distance 106A with respect to electrodes 40C, 40G, 40K on spines 72B, 72D, 72F.

Electrodes 40D, 40H and 40L are fixed to spines 72B, 72D, 72F at position 100D are offset with respect to electrodes 40B, 40F, 40J on spines 72A, 72C, 72E via offset distance 1006C.

The staggering of the electrodes may comprise fixing the respective longitudinal positions of the electrodes on any given spine relative to the longitudinal positions of the electrodes on the spines adjacent to the given spine. In other words, electrodes 40 can be fixed to spines 72 so that the longitudinal position of any given electrode 40 does not have any overlapping coordinates with the respective longitudinal positions of any of the electrodes fixed to the two spines 72 adjacent to the given spine.

In the configuration presented in FIG. 3, the longitudinal positions of a given electrode 40 on a given spine 72 comprises the longitudinal positions, on axis 84, from a proximal end 101 of the given electrode to a distal end 102 of the given electrode, as shown for electrode 40L. The longitudinal position of the given electrode is typically halfway between the proximal and distal ends of the given electrode.

To implement the staggering, the electrodes can be fixed to the spines at predefined distances 104 from distal end 80 (of basket assembly 38), wherein a distance difference 106 of the distance from a given electrode 40 on a given spine to any electrodes 40 on any adjacent spine 72 is a specified amount.

Typically, electrodes 40 have the same or similar lengths. In some embodiments, the staggering can be implemented by fixing each given electrode 40 on a given spine 72 so that the distance (i.e., distance difference 106 as shown in FIG. 3) between the longitudinal position of the given electrode and the longitudinal position of any electrode 40 fixed to an adjacent spine 72 is greater than length 112 of electrodes 40.

In FIG. 3, electrodes 40, distances 104 and distance differences 106 are differentiated by appending a letter to the identifying numeral, so that the distances comprise distances 104A-104D and the differences comprise distance differences 106A-106D. These distances and differences can be measured along axis 84. In the example shown in FIG. 3:

Electrodes 40A, 40E and 40I have distance 104A to distal end 80.

Electrodes 40C, 40G and 40K have distance 104B to distal end 80.

Electrodes 40B, 40F and 40J have distance 104C to distal end 80.

Electrodes 40D, 40H and 40L have distance 104D to distal end 80.

The offset distance between the center of electrodes 40A/40E/40I and center of electrodes 40C/40G/40K comprises distance difference 106A. The offset distance 106A can be measured from the corresponding edge of one electrode 40A to the corresponding edge of the offset electrode 40C.

The distance between electrodes 40C/40G/40K and electrodes 40B/40F/40J comprises offset distance difference 106B. The offset distance 106B can be measured from the corresponding edge of one electrode 40C to the corresponding edge of the offset electrode 40F.

The distance between electrodes 40B/40F/40J and electrodes 40D/40H/40L comprises offset distance difference 106C. The offset distance 106C can be measured from the corresponding edge of one electrode 40B to the corresponding edge of the offset electrode 40D.

In some embodiments, electrodes 40 may be distributed evenly on both sides of an equator 107 of basket assembly 38. Equator 107 can be assumed to correspond to a line through the spines on a plane orthogonal to axis 84 and through a midpoint 108 between proximal end 78 and distal end 80.

In the configuration shown in FIGS. 2 and 3, there are two electrodes 40 inserted through by the spine and thereafter fixed to each spine 72, wherein electrodes 49A, 40C, 40E, 40G, 40I and 40K are on the proximal side of equator 107, and electrodes 40B, 40D, 40F, 40H, 40J and 40L are on the distal side of equator 107.

Electrodes 40 have a width 96 and a height 98. The width of a given electrode attached 40 to a given spine 72 is assumed to correspond to the maximum length of a line in the given electrode, where the line resides in a plane parallel to the plane of the given spine where the given electrode is attached, and the line is orthogonal to the direction of the given spine. The height of the given electrode is assumed to correspond to a maximum length of a line in the given electrode, where the line resides in a plane orthogonal to the plane of the given spine.

In some embodiments, spines 72 are inserted through electrodes 40 where each electrode can be slid along the spines 72 and then affixed to spines 72 so that a distance 109 (i.e., along axis 84) between the proximal end of any given electrode 70 on a first spine 72 and the distal end of any electrode 70 on any adjacent spline is at least zero. This distance 109 enables basket assembly 38 to collapse within sheath 30 as described in the description referencing FIG. 4 hereinbelow.

FIG. 4 is a schematic side view of basket assembly 38 in a collapsed configuration and arranged generally along longitudinal axis 84, in accordance with an embodiment of the present invention. As shown in FIG. 4, the outward bias of electrodes 40 enables spines 72 to lay flush with insertion tube 76 when basket assembly 38 is collapsed within sheath 30.

In some embodiments, lumen 70 has a lumen diameter 110 between 3.0 mm and 3.33 mm (e.g., medical probe 22 is a 10 French catheter). In some embodiments, each given electrode 40 can be dimensioned (i.e., width 96, height 98 and length 112 are set) and positioned on their spines so that the electrodes (i.e., when fixed to their respective spines 72) fit into lumen 70 when basket assembly 38 is collapsed.

Figure 5:
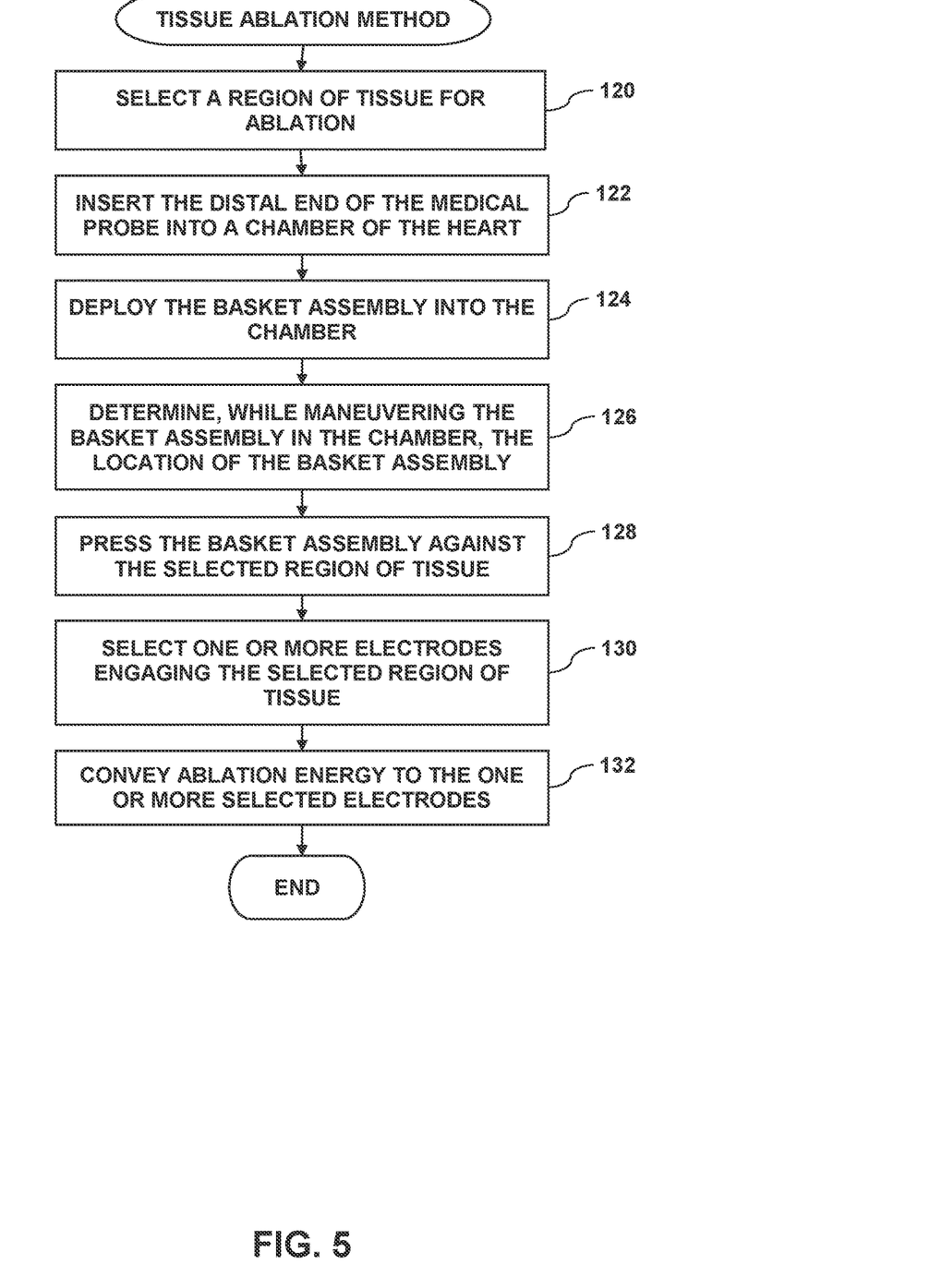
FIG. 5 is a flow diagram that schematically illustrates a method of using the medical probe to perform a tissue ablation medical procedure in a chamber of a heart, in accordance with an embodiment of the present invention.
Figure 6:
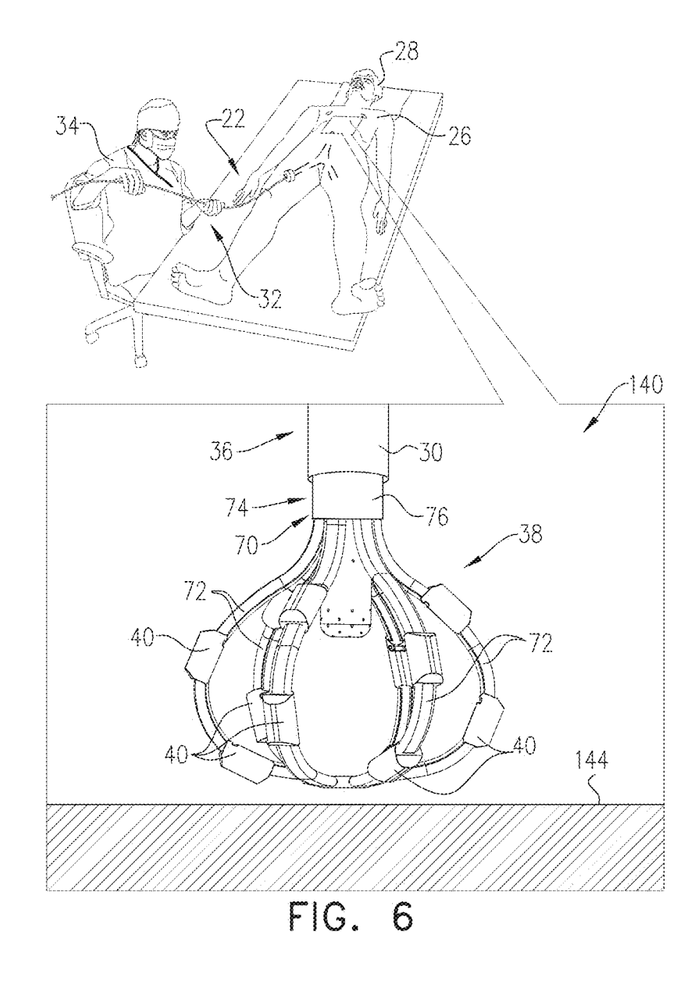
FIGS. 6 and 7 are a schematic pictorial illustrations of the basket assembly inside the chamber of the heart during the medical procedure, in accordance with an embodiment of the present invention.
Figure 7:
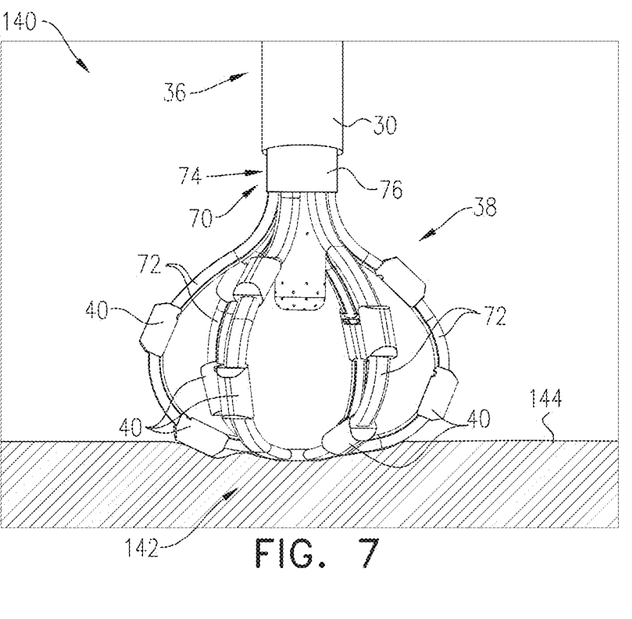

FIG. 5 is a flow diagram that schematically illustrates a method of using medical probe 22 to perform a tissue ablation medical procedure in a chamber 140 of heart 26, and FIGS. 6 and 7 are schematic pictorial illustrations of distal end 74 inside the chamber of the heart during the medical procedure, in accordance with an embodiment of the present invention.

In a tissue selection step 120, medical professional 34 selects a region 142 of intracardial tissue 144, and in an insertion step 122, the medical professional inserts distal end 36 of insertion sheath 30 into chamber 140 of heart 26.

In a deployment step 124, medical professional deploys basket assembly 38 from lumen 70 to chamber 140, as shown in FIG. 6.

As medical professional 34 maneuvers the basket assembly within the chamber (e.g., by manipulating handle 32), processor 46 determines, in a location determination step 126, the location(s) of the basket assembly within the chamber. In some embodiments, processor 46 can present, to medical professional 34 (i.e., in map 62 on display 64), the location(s) of basket assembly 38.

In a positioning step 128, medical professional manipulates handle 32 so as to press one or more electrodes 40 in basket assembly 38 against region 142 of tissue 144, as shown in FIG. 7.

In an electrode selection step 130, medical professional 34 selects (e.g., using a given input device 68) at least one set of electrodes 40 that is engaging intracardiac tissue 144.

In some embodiments, the selected set of electrodes comprise pairs of electrodes 40. In these embodiments, medical system 20 performs IRE ablation by delivering IRE pulses between pairs of electrodes 40. The electrodes in any given set may be fixed to a single spine 72 or to multiple spines 72. Using switching module 58, IRE ablation module 56 can deliver one or more IRE pulses independently between each of the sets of the electrodes.

Finally, in an ablation step 132, in response to an input from medical professional 34, IRE ablation module 56 conveys IRE pulses to the selected electrodes 40A, which the electrodes deliver to the selected region of intracardiac tissue 144, and the method ends. In some embodiments, IRE ablation module 56 can the input from a given input device 68 or from an additional input device (not shown) on handle 32.

While embodiments herein describe IRE ablation module 56 delivering IRE pulses to one or more electrodes 40 so as to ablate intracardiac tissue 144, configuring medical system 20 to deliver, to any electrode 40, other types of ablation energy (e.g., radiofrequency energy) is considered to be within the spirit and scope of the present invention.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A medical probe, comprising:
a flexible insertion tube;
a basket assembly having a proximal end that is connected distally to the insertion tube and comprising a plurality of spines, which have respective outer sides and inner sides and are configured to bow radially outward from an axis of the basket assembly to define an interior portion and are conjoined at the proximal end and at a distal end of the basket assembly; and
a plurality of electrodes, which are fixed to respective ones of the plurality of spines in respective longitudinal positions that are staggered on any given spine relative to the longitudinal positions of the electrodes on the spines adjacent to the given spine, each electrode positioned such that an inwardly-facing side of the electrode that is facing the interior portion is positioned a first distance away from the given spine in a first direction and an outwardly-facing side of the electrode that is facing away from the interior portion is positioned a second distance away from the given spine in a second direction opposite the first direction, the second distance being greater than the first distance, each electrode comprising a conductive material that is biased towards the respective outer side of the given spine such that an exposed surface area of the outwardly-facing side of the electrode is greater than an exposed surface area of the inwardly-facing side of the electrode, each electrode comprising a flat proximal end and a flat distal end, the flat proximal end and the flat distal end being tapered toward the respective outwardly-facing side of the given electrode.

2. The medical probe according to claim 1, and further comprising an electric signal generator coupled to the plurality of electrodes.

3. The medical probe according to claim 2, wherein the electrical signal generator is configured to simultaneously deliver irreversible electroporation (IRE) pulses between one or more electrodes of the plurality of electrodes.

4. The medical probe according to claim 3, wherein the one or more electrodes comprise at least two electrodes fixed to a single given spine or fixed to multiple spines.

5. The medical probe according to claim 2, wherein the electrical signal generator is configured to deliver radio frequency energy to one or more electrodes of the plurality of electrodes.

6. The medical probe according to claim 1, and comprising an insertion sheath containing the insertion tube, wherein the insertion tube has a longitudinal axis, and wherein there is a specified maximum number of the plurality of electrodes at any location on the longitudinal axis when the basket assembly is disposed within the insertion sheath and assumes a collapsed configuration.

7. The medical probe according to claim 6, wherein the plurality of electrodes are dimensioned and positioned on the spines so as to fit within the insertion sheath when the basket assembly assumes the collapsed configuration.

8. The medical probe according to claim 1, wherein the basket assembly has a longitudinal axis and an equator, wherein the longitudinal axis joins the proximal and the distal ends of the basket assembly, wherein the equator corresponding to a line through the spines on a plane orthogonal to the axis and through a midpoint between a proximal end of the basket assembly and a distal end of the assembly on the longitudinal axis, and wherein each of the spines comprises at least one electrode on each side of the equator.

9. The medical probe according to claim 1, wherein any pair of alternating spines in the basket assembly comprises first and second spines having a first electrode at a longitudinal position fixed to the first alternating spine that overlaps the longitudinal position of a second electrode fixed to the second spine.

10. The medical probe according to claim 1, wherein any pair of alternating spines in the basket assembly comprises first and second spines having a pair of electrodes comprising a first electrode fixed to the first spine and a second electrode fixed to the second spine, wherein the first and the second electrodes are fixed to their respective spines at a specified longitudinal distance to the distal end of the basket assembly.

11. The medical probe according to claim 1, wherein any pair of adjacent spines in the basket assembly comprises first and second spines having a pair of electrodes comprising a first electrode fixed to the first spine and a second electrode fixed to the second spine, and wherein the staggering comprises the first and the second electrodes fixed to their respective spines at a specified longitudinal distance to each other.

12. The medical probe according to claim 11, wherein each electrode of the plurality of electrodes comprises a length on the axis of the basket assembly, and wherein the specified longitudinal distance is greater than the length of each electrode of the plurality of electrodes.

13. A method for fabricating a medical probe, comprising:
providing a flexible insertion tube;
providing a basket assembly having a proximal end that is connected distally to the insertion tube and comprising a plurality of spines, which have respective outer sides and inner sides and are configured to bow radially outward from an axis of the basket assembly to define an interior portion and are conjoined at the proximal end and at a distal end of the basket assembly; and
providing a plurality of electrodes, which are fixed to respective ones of the plurality of spines in respective longitudinal positions that are staggered on any given spine relative to the longitudinal positions of the electrodes on the spines adjacent to the given spine, each electrode positioned such that an inwardly-facing side of the electrode that is facing the interior portion is positioned a first distance away from the given spine in a first direction and an outwardly-facing side of the electrode that is facing away from the interior portion is positioned a second distance away from the given spine in a second direction opposite the first direction, the second distance being greater than the first distance, each electrode comprising a conductive material that is biased towards the respective outer side of the given spine such that an exposed surface area of the outwardly-facing side of the electrode is greater than an exposed surface area of the inwardly-facing side of the electrode, each electrode comprising a flat proximal end and a flat distal end, the flat proximal end and the flat distal end being tapered toward the respective outwardly-facing side of the given electrode.

14. The method according to claim 13, and further comprising providing an electric signal generator coupled to the plurality of electrodes.

15. The method according to claim 14, wherein the electrical signal generator is configured to simultaneously deliver irreversible electroporation (IRE) pulses between one or more electrodes of the plurality of electrodes.

16. The method according to claim 15, wherein the one or more electrodes comprise at least two electrodes fixed to a single given spine or fixed to multiple spines.

17. The method according to claim 14, wherein the electrical signal generator is configured to deliver radio frequency energy to one or more electrodes of the plurality of electrodes.

18. The method according to claim 13, and further comprising providing an insertion sheath containing the insertion tube, wherein the insertion tube has a longitudinal axis, and wherein there is a specified maximum number of electrodes of the plurality of electrodes at any location on the longitudinal axis when the basket assembly is disposed within the insertion sheath and assumes a collapsed configuration.

19. The method according to claim 18, wherein the plurality of electrodes are dimensioned and positioned on the plurality of spines so as to fit within the insertion sheath when the basket assembly assumes the collapsed configuration.

20. The method according to claim 13, wherein the basket assembly has a longitudinal axis and an equator, wherein the longitudinal axis joins the proximal and the distal ends of the basket assembly, wherein the equator corresponding to a line through the plurality of spines on a plane orthogonal to the axis and through a midpoint between a proximal end of the basket assembly and a distal end of the assembly on the longitudinal axis, and wherein each spine of the plurality of spines comprises at least one electrode on each side of the equator.

21. The method according to claim 13, wherein any pair of alternating spines in the basket assembly comprises first and second spines having a first electrode at a longitudinal position fixed to the first alternating spine that overlaps the longitudinal position of a second electrode fixed to the second spine.

22. The method according to claim 13, wherein any pair of alternating spines in the basket assembly comprises first and second spines having a pair of electrodes comprising a first electrode fixed to the first spine and a second electrode fixed to the second spine, wherein the first and the second electrodes are fixed to their respective spines at a specified longitudinal distance to the distal end of the basket assembly.

23. The method according to claim 13, wherein any pair of adjacent spines in the basket assembly comprises first and second spines having a pair of electrodes comprising a first electrode fixed to the first spine and a second electrode fixed to the second spine, and wherein the staggering comprises the first and the second electrodes fixed to their respective spines at a specified longitudinal distance to each other.

24. The method according to claim 23, wherein each electrode of the plurality of electrodes comprises a length on the axis of the basket assembly, and wherein the specified longitudinal distance is greater than the length of each electrode of the plurality of electrodes.

25. A method for treatment, comprising:
inserting, into a body cavity, an insertion tube having a distal end containing a lumen passing through the insertion tube;
deploying, into the body cavity from the distal end, a basket assembly having a proximal end that is connected distally to the insertion tube and comprising:
a plurality of spines, which have respective outer sides and inner sides and are configured to bow radially outward from an axis of the basket assembly to define an interior portion and are conjoined at the proximal end and at a distal end of the basket assembly, and
a plurality of electrodes, which are fixed to respective ones of the plurality of spines in respective longitudinal positions that are staggered on any given spine relative to the longitudinal positions of the electrodes on the spines adjacent to the given spine, each electrode positioned such that an inwardly-facing side of the electrode that is facing the interior portion is positioned a first distance away from the given spine in a first direction and an outwardly-facing side of the electrode that is facing away from the interior portion is positioned a second distance away in a second direction opposite the first direction, the second distance being greater than the first distance, each electrode comprising a conductive material that is biased towards the respective outer side of the given spine such that an exposed surface area of the outwardly-facing side of the electrode is greater than an exposed surface area of the inwardly-facing side of the electrode, each electrode comprising a flat proximal end and a flat distal end, the flat proximal end and the flat distal end being tapered toward the respective outwardly-facing side of the given electrode;

positioning the basket assembly so that one or more electrodes of the plurality of electrodes press against tissue in the body cavity;

selecting at least two sets of electrodes of the plurality of electrodes; and conveying, between the selected two sets of electrodes, ablation energy to the tissue.

* * * * *